(12) United States Patent
Talagala et al.

(10) Patent No.: US 12,713,149 B2
(45) Date of Patent: Aug. 18, 2026

(54) METHOD FOR DETECTING DEFECTIVE PIXEL VALUES

(71) Applicant: Arm Limited, Cambridge (GB)

(72) Inventors: Dumidu Sanjaya Talagala, Coventry (GB); David Hanwell, Sale (GB); Nerhun Yildiz, Loughborough (GB)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 18/956,303

(22) Filed: Nov. 22, 2024

(65) Prior Publication Data

US 2025/0184635 A1 Jun. 5, 2025

(30) Foreign Application Priority Data

Nov. 30, 2023 (EP) .................................... 23213448

(51) Int. Cl.
*H04N 25/68* (2023.01)
*G06T 5/20* (2006.01)
(Continued)

(52) U.S. Cl.
CPC ........... *H04N 25/68* (2023.01); *H04N 25/134* (2023.01)

(58) Field of Classification Search
CPC ........ H05N 25/68; H04N 25/134; G06T 5/77; G06T 5/20
See application file for complete search history.

(56) References Cited

U.S. PATENT DOCUMENTS 9,578,320 B1 * 2/2017 Li .......................... H04N 25/68
10,440,299 B2 * 10/2019 Lin ...................... H04N 25/683
(Continued)

FOREIGN PATENT DOCUMENTS

CN 112365435 A 2/2021
EP 2491710 A1 4/2010
(Continued)

OTHER PUBLICATIONS

"Detection, Location and Concealment of Defective Pixels in Image Sensors", IEEE Transactions on Emerging Topics in Computing, IEEE, USA, vol. 9, No. 2,Feb. 27, 2020 (Feb. 27, 2020), pp. 664-679, XP011858557, DOI: 10.1109/TETC.2020.2976807 [retrieved on Jun. 4, 2021] *abstract ** p. 669, col. 2-p. 671, col. 1.

*Primary Examiner* — Marly S Camargo
(74) *Attorney, Agent, or Firm* — EIP US LLP

(57) ABSTRACT

A method for detecting defective pixel values determines an isotropic dispersion difference value by determining a ratio or difference between a pixel error and an isotropic dispersion, where the isotropic dispersion is a measure of how much pixel values in a set of neighbouring pixel values uniformly distributed around the pixel under consideration vary. The method compares the isotropic dispersion difference value to an isotropic threshold. A directional dispersion difference value is found by determining a ratio or difference between a pixel error and a directional dispersion, wherein the directional dispersion is a weighted measure of how much pixel values in a set of neighbouring pixel values around the pixel under consideration in a given direction vary. The directional dispersion difference value is compared to a directional threshold and it is determined that the pixel under consideration is defective based on at least one of the comparison results.

15 Claims, 10 Drawing Sheets

(51) Int. Cl.

| | |
|---|---|
| ***G06T 5/77*** | (2024.01) |
| ***H04N 25/13*** | (2023.01) |

(56) References Cited

U.S. PATENT DOCUMENTS

| | | | | |
|---|---|---|---|---|
| 11,228,723 | B2 | 1/2022 | Hanwell et al. | |
| 2003/0179418 | A1 | 9/2003 | Wengender | |
| 2005/0219390 | A1 | 10/2005 | Tajima et al. | |
| 2005/0231617 | A1 | 10/2005 | Kitani | |
| 2006/0239580 | A1* | 10/2006 | Dierickx | G06T 4/77 382/274 |
| 2007/0030365 | A1 | 2/2007 | Jerdev | |
| 2008/0049125 | A1 | 2/2008 | Subbotin | |
| 2009/0303357 | A1* | 12/2009 | Tajima | H04N 25/136 348/246 |
| 2011/0102624 | A1* | 5/2011 | Hashizume | H04N 25/683 348/246 |
| 2012/0230591 | A1* | 9/2012 | Shibata | G06T 4/77 382/196 |
| 2013/0329098 | A1 | 12/2013 | Lim et al. | |
| 2015/0170376 | A1* | 6/2015 | Bishop | H04N 25/68 382/167 |
| 2016/0006960 | A1 | 1/2016 | Takahashi | |
| 2017/0070692 | A1 | 3/2017 | Lin et al. | |
| 2018/0160064 | A1 | 6/2018 | Mahara | |
| 2019/0166320 | A1 | 5/2019 | Maruyama et al. | |
| 2026/0025580 | A1* | 1/2026 | Talagala | H04N 23/673 |

FOREIGN PATENT DOCUMENTS

| | | | |
|---|---|---|---|
| JP | 2017022671 | A1 | 1/2017 |
| WO | 2017105846 | A1 | 6/2017 |

* cited by examiner

Standard isotropic mask $$\begin{bmatrix} 1 & 0 & 1 & 0 & 1 \\ 0 & 0 & 0 & 0 & 0 \\ 1 & 0 & X & 0 & 1 \\ 0 & 0 & 0 & 0 & 0 \\ 1 & 0 & 1 & 0 & 1 \end{bmatrix}$$

Fig. 4a

Standard directional SAD weights

Vertical
$$\begin{bmatrix} 62 & 0 & 70 & 0 & 62 \\ 0 & 0 & 0 & 0 & 0 \\ 62 & 0 & X & 0 & 62 \\ 0 & 0 & 0 & 0 & 0 \\ 62 & 0 & 70 & 0 & 62 \end{bmatrix} /512$$

Horizontal
$$\begin{bmatrix} 62 & 0 & 62 & 0 & 62 \\ 0 & 0 & 0 & 0 & 0 \\ 70 & 0 & X & 0 & 70 \\ 0 & 0 & 0 & 0 & 0 \\ 62 & 0 & 62 & 0 & 62 \end{bmatrix} /512$$

d45°
$$\begin{bmatrix} 56 & 0 & 65 & 0 & 70 \\ 0 & 0 & 0 & 0 & 0 \\ 65 & 0 & X & 0 & 65 \\ 0 & 0 & 0 & 0 & 0 \\ 70 & 0 & 65 & 0 & 56 \end{bmatrix} /512$$

d135°
$$\begin{bmatrix} 70 & 0 & 65 & 0 & 56 \\ 0 & 0 & 0 & 0 & 0 \\ 65 & 0 & X & 0 & 65 \\ 0 & 0 & 0 & 0 & 0 \\ 56 & 0 & 65 & 0 & 70 \end{bmatrix} /512$$

Fig. 4b

| B | G |
|---|---|
| G | R |

| B | G | R | G |
|---|---|---|---|
| G | I | G | I |
| R | G | B | G |
| G | I | G | I |

Fig. 8

METHOD FOR DETECTING DEFECTIVE PIXEL VALUES

CROSS REFERENCE TO RELATED APPLICATION

This application claims the benefit under 35 U.S.C. § 119(a) and 37 CFR § 1.55 to European patent application no. 23213448.6, filed on Nov. 30, 2023, the entire content of which is incorporated herein by reference.

TECHNICAL FIELD

The present invention relates to a method device and program for detecting defective pixel values.

BACKGROUND

Pixel error detection in images is a process employed to identify and rectify anomalies or inaccuracies in individual pixel values within a digital image. These errors can occur due to a range of factors, such as sensor malfunction (e.g., dead or hot sensor sites), noise arising during normal function of the sensor (e.g., thermal noise and other factors), and data corruption during transmission or storage. Detecting and addressing these errors is beneficial in applications ranging from photography to medical imaging and computer vision.

In digital images, red, green, and blue (RGB) channels are components of the commonly used RGB colour space used to represent and display colours on devices such as displays. The RGB colour model is an additive colour model in which colours are created by combining different intensities of red, green, and blue light. Each channel corresponds to one of these primary colours, and together they form a full-colour image. Each channel of an RGB image may include pixel values. For example, in an 8-bit representation, each channel may have a value between 0 and 255 for each of the three colour channels.

In order to generate an image, image capture may be performed using a sensor with a Bayer array. The Bayer filter is a mosaic of colour filters placed over the pixels of an image sensor, allowing for the capture of complete colour information even though each pixel only records one colour channel (either red, green, or blue). The Bayer array typically consists of red, green, and blue colour filters arranged in a specific pattern.

To produce a full-colour image, a process called demosaicing (also known as interpolation) is applied to the raw sensor data. This process involves estimating the missing colour information at each pixel by interpolating values from neighbouring pixels. Various algorithms are used for this purpose that take into account the different filter patterns to create a full-colour image.

Pixel defect detection may be performed on RGB data output from image sensors. Once pixel errors are detected, various corrective measures can be taken. These may include replacing erroneous pixels with estimated values based on neighbouring pixels or requesting retransmission of corrupted data in cases of image transmission errors.

Accordingly, to improve image quality, it is desirable to provide improved methods for detecting defective pixel values in a digital image.

SUMMARY

According to a first aspect of the present invention, there is provided a method comprising: receiving digital image data; for each pixel of the digital image data: determining an isotropic dispersion difference value by determining a ratio or difference between a pixel error and an isotropic dispersion, wherein the pixel error is a difference between a pixel value under consideration and an estimated pixel value, the estimated pixel value is determined based on neighbouring pixel values, and the isotropic dispersion is a measure of how much pixel values in a set of neighbouring pixel values uniformly distributed around the pixel under consideration vary; comparing the isotropic dispersion difference value to an isotropic threshold; determining a directional dispersion difference value by determining a ratio or difference between the pixel error and a directional dispersion, wherein the directional dispersion is a weighted measure of how much pixel values in a set of neighbouring pixel values around the pixel under consideration in a given direction vary; comparing the directional dispersion difference value to a directional threshold; and determining that the pixel under consideration is defective based on at least one of the comparison results.

The isotropic dispersion may be a measure of how much pixel values in a set of neighbouring pixel values uniformly distributed around the pixel under consideration vary around a reference value from the set of neighbouring pixels. The isotropic dispersion may be determined as a sum of absolute differences compared to the reference pixel value. The reference value may be determined as a median value or an average value or a combination of the mean value and average value of the set of neighbouring pixels.

The pixel under consideration may be determined to be defective if at least one of: the isotropic dispersion difference value is greater than the isotropic threshold and the directional dispersion difference value is greater than the directional threshold.

The method may further comprise determining an edge response value based on one or more gradients between neighbouring pixel values of the pixel under consideration. In some embodiments the isotropic threshold and the directional threshold vary as a function of the edge response.

Lower values of the edge response may correspond to flatter regions of the digital image data. Further, higher values of the edge response may correspond to edge regions of the digital image data. The isotropic threshold may take one or more lower value than the directional threshold at lower values of the edge response. Further the directional threshold may take one or more lower value than the isotropic threshold at higher values of the edge response.

The isotropic threshold may vary with edge response such that it has an isotropic lower value and an isotropic upper value and a transition between the isotropic lower value and the isotropic upper value. The transition between the isotropic lower value and the isotropic upper value may be a ramp or a predefined function. In some embodiments, the values of the edge response may be determined using a look-up table. The directional threshold may vary with edge response such that it has a directional lower value and a directional upper value and transitions between the directional lower value and the directional upper value. The isotropic lower value may be lower than the directional upper value at lower values of the edge response. The directional lower value may be lower than the isotropic upper value at higher values of the edge response.

In some embodiments, the edge response is determined based on a largest of a plurality of gradients in different directions determined for the pixel under consideration.

In some implementations, each of the gradients may be determined based on gradients in the same direction across a plurality of colour channels.

A plurality of local directional dispersions may be determined by performing a weighted sums of absolute differences compared to a reference pixel value on a set of pixels surrounding the pixel under consideration. The weights for each of the local directional dispersions may more heavily weight dispersions associated with pixels in different directions from the pixel under consideration. In some cases, the directional dispersion may be selected to be the smallest local directional dispersion. The reference value may be determined as a median value or an average value or a combination of the mean value and average value.

The method may further comprise determining a corrected value for a pixel that is determined to be defective. The corrected value may be determined by interpolation from neighbouring pixel values, excluding the defective pixel.

In a case that a pixel under consideration is determined to be defective based on comparison of the directional dispersion difference value to the directional threshold, the defective pixel may be corrected with an interpolated value determined using neighbouring pixel values excluding the defective pixel location in a direction corresponding to the smallest local directional dispersion that forms the directional dispersion.

In other cases, in which a pixel under consideration is determined to be defective based on comparison of the directional dispersion difference value to the directional threshold, the defective pixel may be corrected with an interpolated value determined using neighbouring pixel values excluding the defective pixel location in a direction determined based on one or more gradients determined using neighbouring pixels and excluding the pixel under consideration.

The digital image data may be one of data from an RGB Bayer sensor array, data from an RGB-IR sensor array, data from a monochromatic sensor array, or data from any other colour filter pattern sensor array.

The estimated pixel value may be a median value of a set of surrounding pixels or an average value of the set of surrounding pixels, or a combination of the median value and average value, or an edge-aware pixel estimate where a sub-set of pixels on the same edge are used to determine a median value, an average value or a combination of a median value and the average value.

According to a second aspect of the present invention there is provided a digital image data processing device comprising: one or more hardware units configured to: receive digital image data; for each pixel of the digital image data: determine an isotropic dispersion difference value by determining a ratio or difference between a pixel error and an isotropic dispersion, wherein the pixel error is a difference between a pixel value under consideration and an estimated pixel value, the estimated pixel value is determined based on neighbouring pixel values, and the isotropic dispersion is a measure of how much pixel values in a set of neighbouring pixel values uniformly distributed around the pixel under consideration vary; compare the isotropic dispersion difference value to an isotropic threshold; determine a directional dispersion difference value by determining a ratio or difference between a pixel error and a directional dispersion, wherein the directional dispersion is a weighted measure of how much pixel values in a set of neighbouring pixel values around the pixel under consideration in a given direction vary; compare the directional dispersion difference value to a directional threshold; and determine that the pixel under consideration is defective based on at least one of the comparison results.

The one or more hardware units may include circuitry such as one or more application specific integrated circuits, one or more processor, one or more field programmable gate array, a storage unit or the like. The circuitry may include a storage unit and/or input/output interfaces for communicating with external devices.

According to a third aspect of the present invention there is provided a program that, when executed by a digital image processing device, causes the digital image processing device to perform a method comprising: receiving digital image data; for each pixel of the digital image data: determining an isotropic dispersion difference value by determining a ratio or difference between a pixel error and an isotropic dispersion, wherein the pixel error is a difference between a pixel value under consideration and an estimated pixel value, the estimated pixel value is determined based on neighbouring pixel values, and the isotropic dispersion is a measure of how much pixel values in a set of neighbouring pixel values uniformly distributed around the pixel under consideration vary; comparing and the isotropic dispersion difference value to an isotropic threshold; determining a directional dispersion difference value by determining a ratio or difference between a pixel error and a directional dispersion, wherein the directional dispersion is a weighted measure of how much pixel values in a set of neighbouring pixel values around the pixel under consideration in a given direction vary; comparing the directional dispersion difference value to a directional threshold; and determining that the pixel under consideration is defective based on at least one of the comparison results.

Further features and advantages of the invention will become apparent from the following description of preferred embodiments of the invention, given by way of example only, which is made with reference to the accompanying drawings.

BRIEF DESCRIPTION OF THE DRAWINGS

FIGS. 4*a* and 4*b* show kernels used for calculating median and dispersion statistics in the digital image data;

FIG. 8 shows a plurality of colour filter array patterns.

DETAILED DESCRIPTION

Methods and devices will be described below for detecting defective pixels in digital images.

Figure 1:
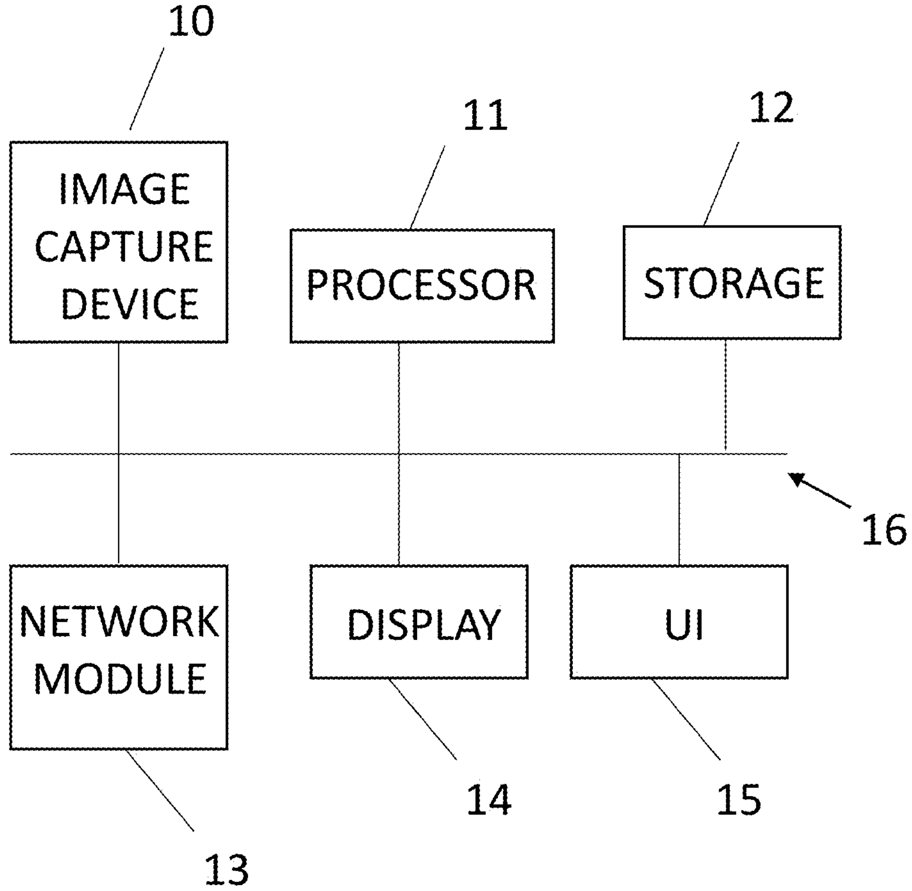
FIG. 1 is a schematic diagram showing a device for processing digital image data.

FIG. 1 is a schematic diagram of a device for processing digital image data. The device comprises an image capture device 10, a processor 11, a storage 12, a network module 13, a display 14, and user interface 15. Components of the device are connected by a bus 16. The image capture device 10 may be a camera or the like configured to capture still images and video data. The processor 11 may a central processing unit or other type of processing unit, and the storage 12 may be a memory device such as an SSD, a hard drive, or the like. The network module 13 may be a Wi-Fi® or other network module or mobile telecommunications module that allows the device to communicate over one or more wired or wireless networks. The device may be operable to send or receive image data via the network module 13. The display 14 may be an OLED, micro-LED or other display that may be used to display information to a user of the device. The user interface 15 may take the form of a touch screen, keyboard, mouse, or other input device to allow a user to interact with the device. The depicted components are not essential, and the device may include other components not shown.

The device for processing digital image data may in some examples be a mobile device such as a mobile phone or PDA. In other examples the device may be a computer such as a laptop or desktop PC. In other examples the device may be a server or cloud service. These examples are not exhaustive, and the device make take other forms not mentioned.

Any method described below may be implemented as a computer program. The computer program may be stored on a computer-readable storage medium and read by one or more information processing apparatus, such as the devices described above, for the purposes of performing such a method.

In further embodiments the methods below may be implemented in hardware and performed using fixed function circuitry. Fixed function circuitry may comprise dedicated hardware circuitry that is configured specifically to perform a fixed function, and that is not reconfigurable to perform a different function. In this way, the fixed function circuitry can be considered distinct from a programmable circuit that is configured to receive and decode instructions defined, for example, in a software program. For example, the fixed function circuitry may not be reconfigurable to perform another function.

Fixed-function circuitry may comprise at least one electronic circuit for performing an operation. Any fixed function circuitry may comprise application-specific integrated circuitry. The application-specific integrated circuitry may comprise one or more integrated circuits and may be designed using a hardware description language such as Verilog and implemented as part of the fabrication of an integrated circuit. The application-specific integrated circuitry may comprise a gate array or a full custom design.

The following methods detect defective pixels by analysing pixels in a digital image one-by-one. The methods respond differently depending on whether the pixel under consideration is in a flat portion of the image or located on or close to an edge. As described further below, in dependence upon the position of the pixel, a different defect detection equation may be triggered. Optionally, once a defective pixel has been identified, the pixel value may be replaced by an estimated pixel value to correct the image data.

Figure 2:
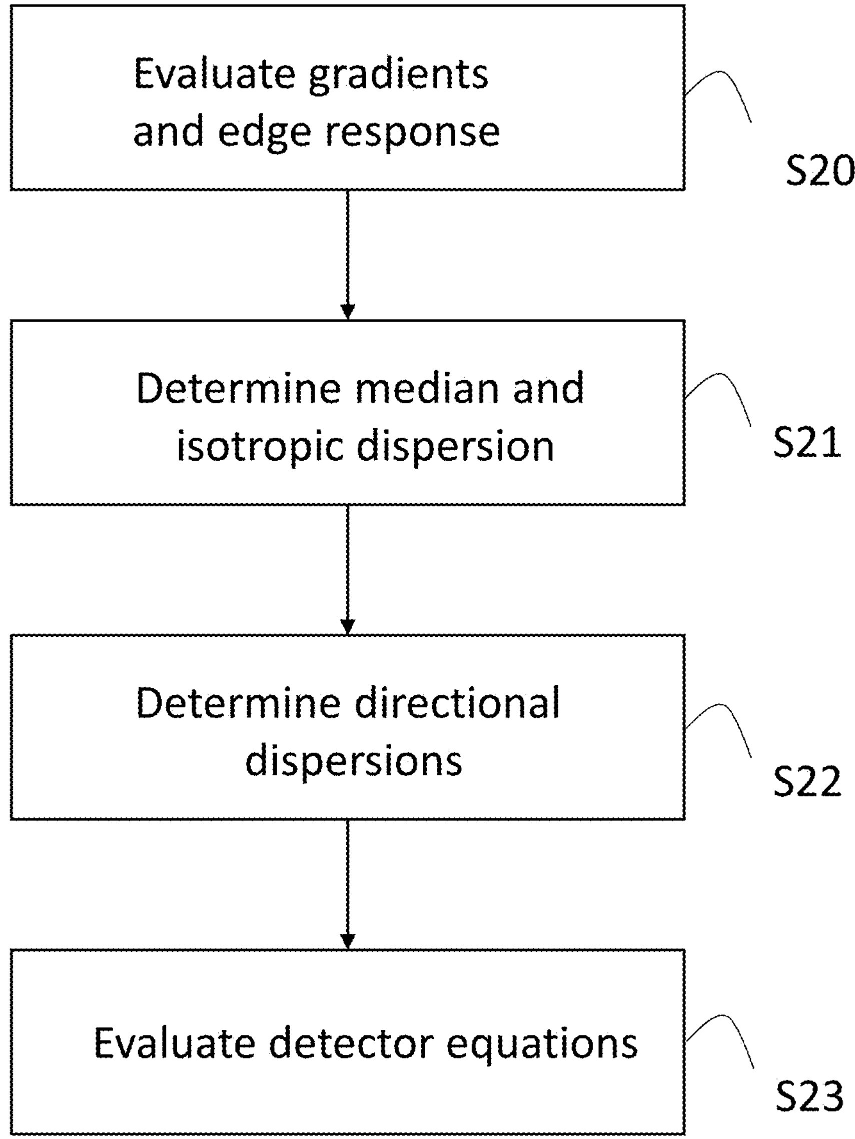
FIG. 2 is a flow chart showing steps for detecting defective pixels.

FIG. 2 is a flow chart showing steps for detecting defective pixels. The steps of the method are performed on a pixel-by-pixel basis on image data input to the pixel defect detector. In the embodiments described below, each pixel belongs to a respective colour channel of the image data. Accordingly, pixel defect detection is performed separately on pixels from each colour channel.

In a first step, S20, gradients are calculated using pixel values of digital image data neighbouring a pixel under consideration. As will be described further below, an edge response value may be derived from the calculated gradient values.

In step S21 a median value is determined from neighbouring pixels. Further, an isotropic dispersion is calculated from the neighbouring pixels using a sum of absolute differences technique.

In step S22, directional dispersions are calculated from neighbouring pixels by performing a weighted sum of absolute differences technique in which different surrounding pixels carry different weights.

In step S23, two different defective pixel defect detection conditions are calculated as will be explained in greater detail below. If either or both of the conditions are met, the pixel is determined to be a defective pixel.

Figure 3A:
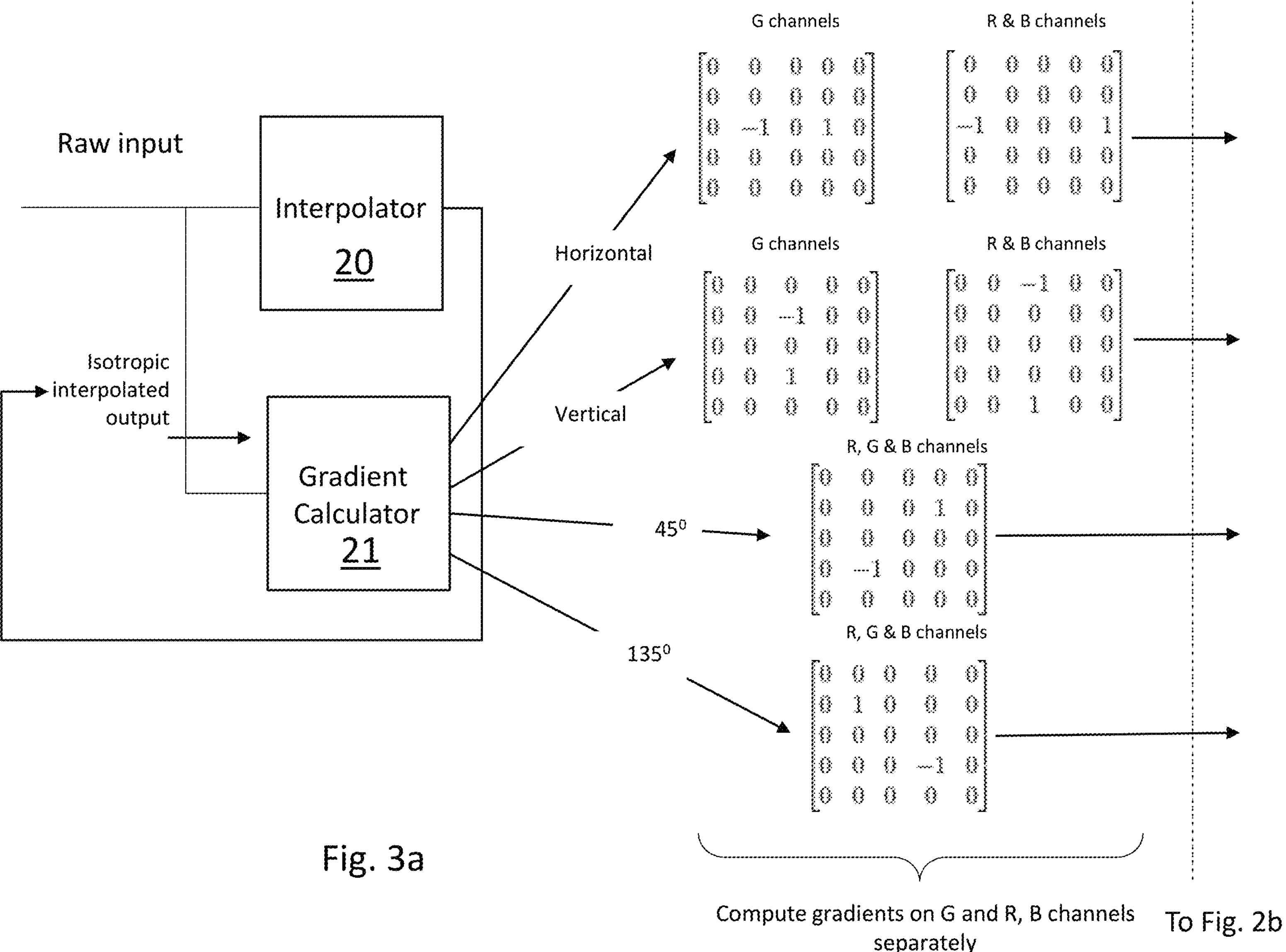
FIGS. 3*a* and 3*b* show kernels used for detecting gradients in the digital image data.
Figure 3B:
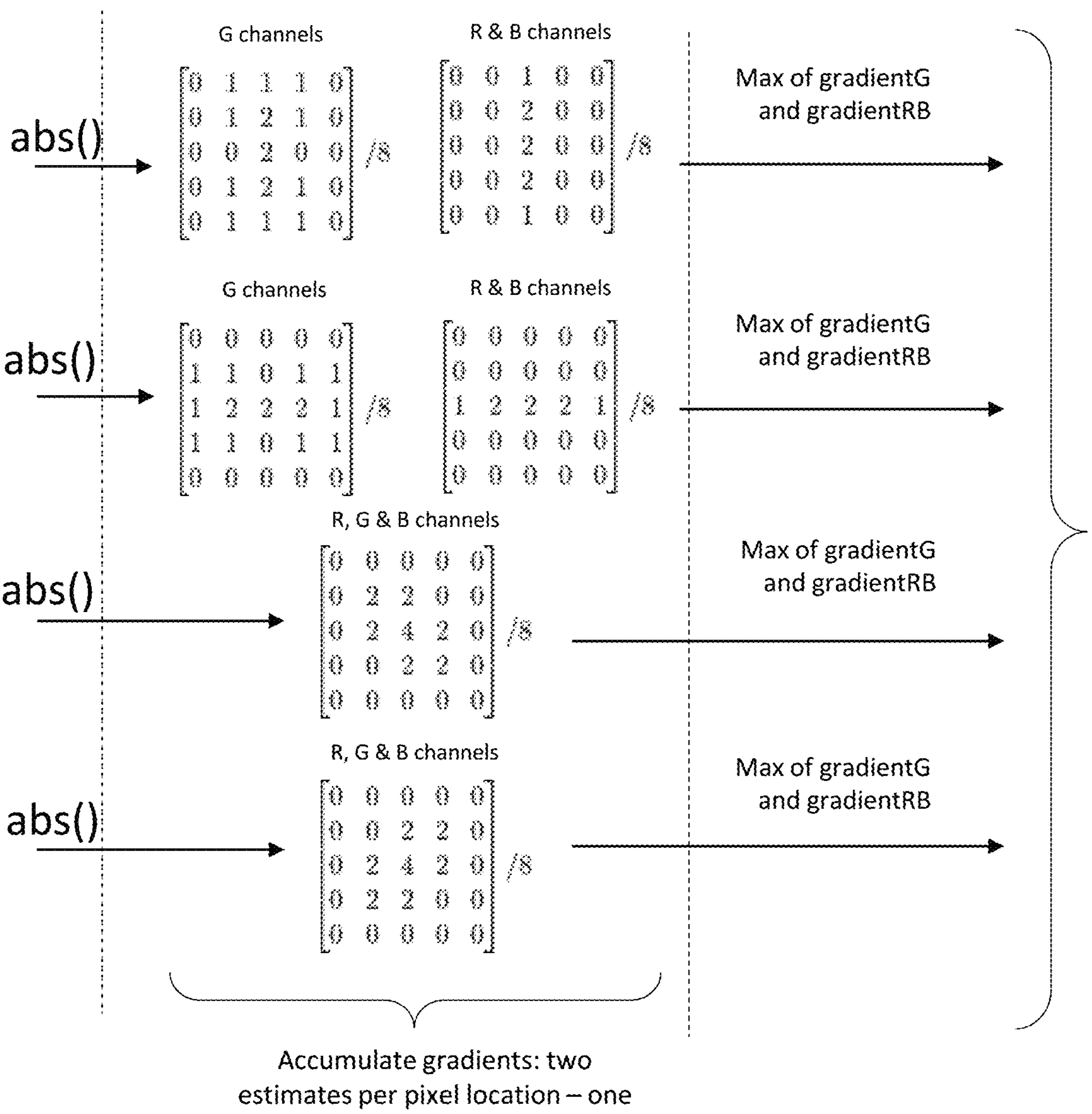

FIGS. 3*a* and 3*b* show kernels for detecting gradients in step S20. At a lower portion of the FIG. 3*a*, RAW input corresponding to image data from a digital image is input into the pixel defect detector. The RAW input image data may be image data directly from an image sensor or may have already been subject to some prior processing. The RAW input data has three channels corresponding to Red, Green, and Blue. The pixel data is arranged in an RGB Bayer array as illustrated in an upper portion of FIG. 8. In further embodiments described further below, the RAW input data may have three or four channels depending on the colour filter array.

Figure 7:
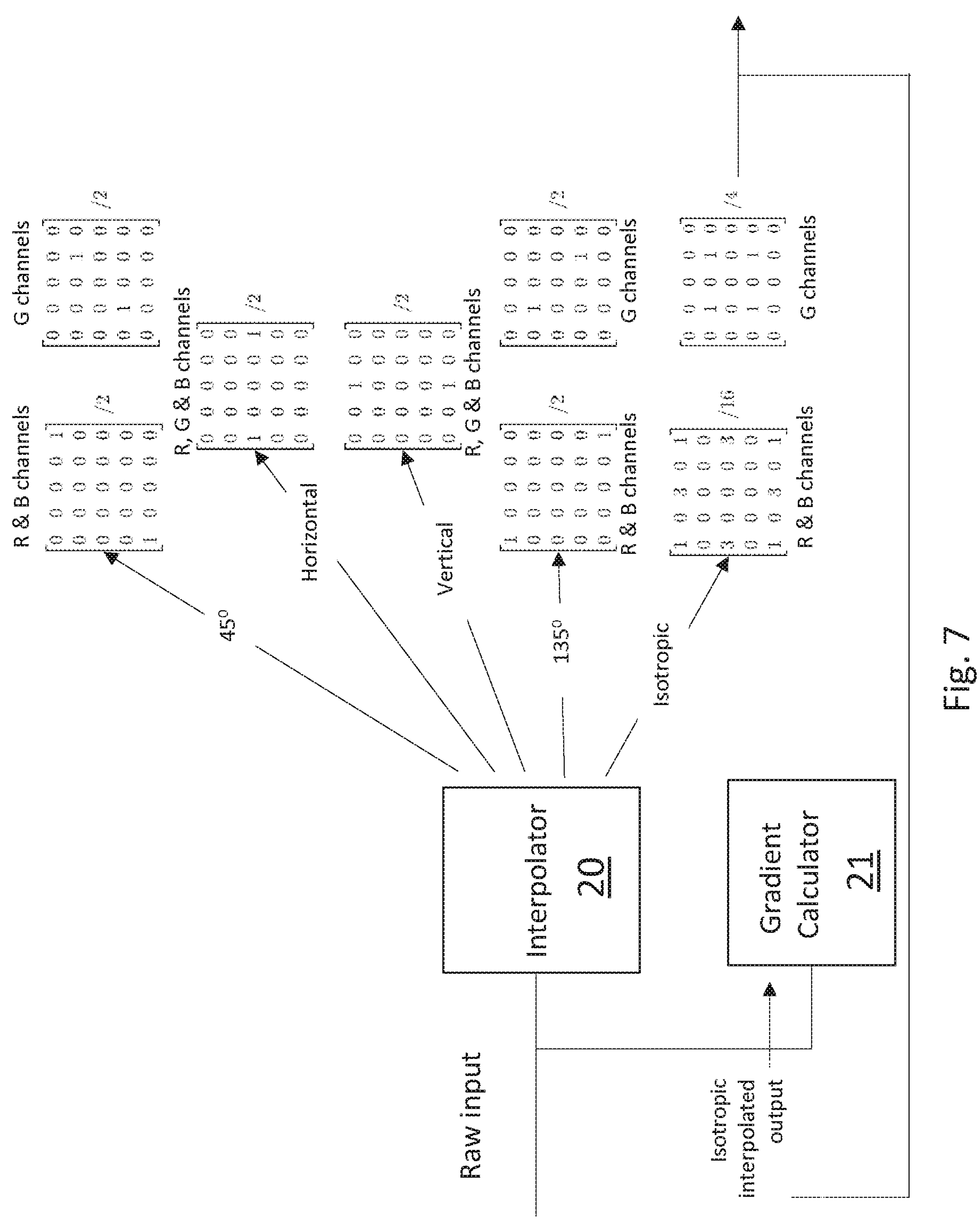
FIG. 7 shows kernels for performing interpolation of digital image data.

Interpolator 20 performs isotropic interpolation on the input image data to generate an estimated value for each pixel value under consideration based on the values of the surrounding pixels in the same colour channel. An example of a kernel for performing isotropic interpolation will be described further below and is shown in FIG. 7. The interpolated value for the pixel under consideration along with values of surrounding pixels, which may be stored in delay lines, are input into a gradient calculator 21.

The gradient calculator 21 is configured to calculate gradients in four different directions. The gradient calculator 21 calculates a horizontal gradient, a vertical gradient, and two orthogonal diagonal gradients. The diagonal gradients are at 45 degrees and 135 degrees. As illustrated in FIG. 2*a*, the gradients are calculated for each of the Red (R), Green (G) and Blue (B) channels. In the case of the vertical and horizontal gradients different kernels are used for the Green channel as compared to the Blue channel. The gradients may be calculated across a cluster of values in a Bayer array as shown at the top of FIG. 8 that includes the pixel under consideration.

The kernels for calculating the different gradients are shown in FIG. 3*a*. The 5×5 size of the kernels shown is illustrative and different size kernels may be used in other embodiments. Further, the values within the kernels may vary depending on the application and are shown by way of illustration only. The illustrated kernels are for processing image data output from a sensor that has a standard Bayer RGB data output. The techniques described herein may be adapted to other image data formats as will be discussed further below. The illustrated kernels are multiplied by a 5×5 grid of image data in a single colour channel with the pixel under consideration in the centre of the grid of image data. The result of multiplying the gradient kernels with the image data is a 5×5 grid of data. It is noted that the illustrated kernels do not use the pixel under consideration to calculate the gradients. In other embodiments, an interpolated value for the pixel under consideration could be used.

FIG. 3*b* shows further processing of the gradients calculated in FIG. 3*a*. On the left-side of FIG. 3*b*, an absolute value of the gradient values in the grids of data generated in each of the different directions shown in FIG. 3*a* is calculated. The gradients are then accumulated using the kernels shown to generate a scalar gradient estimate in each direction for each of G (the green channel) and a combined R and B (red and blue) channel.

On the right-side FIG. 3*b* a maximum of the accumulated gradient of the Green channel and the accumulated gradient for the Red and Blue channels is determined for each of the different gradient directions. Finally, not shown in FIG. 3*b*, a largest directional gradient is determined. The largest direction gradient will be referred to below as the edge response.

FIG. 4*a* shows a kernel that may be used for determining an isotropic median pixel value and an isotropic dispersion estimation for pixel values surrounding a pixel under consideration. The kernel is used in step S21. The values in the kernel shown in FIG. 4*a* show the pixels selected from the digital image when determining a median or dispersion in connection with a pixel X at the centre of the kernel. In this example, eight pixels are selected to determine the median value. However, in other embodiments, four or two pixels may be selected. The pixels are all selected within a single-color channel. To detect the median pixel value, the selected pixels are placed in numerical order and a value halfway between the two middle numbers is determined. To calculate an isotropic dispersion, a sum of absolute differences between the median value of the selected pixels and the pixel values in the neighbouring locations shown in the kernel is calculated.

FIG. 4*b* shows weights for calculating dispersion in different directions in step S22. The pixel values are selected as shown in the kernels. As with the isotropic dispersion, the calculation is a sum of absolute differences (SAD) of the pixel values indicated by the kernel. The determined absolute difference between each pixel value and the median value of the selected pixel values is multiplied by the indicated weights and added together. The total is then normalized, in this case by dividing by five hundred and twelve. Other embodiments may use different weights and the value used to normalize may be accordingly differ between embodiments. Accordingly, four directional dispersions are generated in each of the horizontal, vertical and two orthogonal diagonal directions. A minimum of the different directional dispersions is selected as a directional dispersion, $SAD_{dir}$.

The sum of absolute differences is calculated as:

$$SAD_x = \sum_{i=1}^{8} W_i \times |P_i - \hat{X}|$$

where SAD is the sum of absolute differences, $P_i$ is the pixel value at the location and $W_i$ is the weight at the location as shown in FIG. 4*b* and $\hat{X}$ is the median value of pixel values $P_i$. The median value is used in the implementation described above. However, in other implementations $\hat{X}$ may be an average value of the pixel values $P_i$ or some other reference pixel value.

In order to detect defective pixels, the following two determinations are made by the pixel defect detector in step S23 corresponding to an isotropic defect detector equation and a directional defect detector equation:

$$\text{Defect}_{iso} = \frac{Img - \text{median}(Img)}{SAD_{iso}} > \text{thresh}_{iso} \quad \text{equation 1}$$

-continued $$\text{Defect}_{dir} = \frac{Img - \text{median}(Img)}{SAD_{dir}} > \text{thresh}_{dir} \quad \text{equation 2}$$

The value, Img, in the equations above is the value of a pixel under consideration by the pixel defect detector. The value median (Img) is a median value of the surrounding pixels determined using the kernel shown in FIG. 4*a* and as described above. The median value of the surrounding pixels may be considered to be an estimate of the pixel value under consideration. The value $SAD_{iso}$ is an isotropic dispersion determined using the kernel shown in FIG. 4*a* and calculated as described above.

In equation 1, a pixel error, that is the difference between the pixel under consideration, img, and the estimated pixel value, median (img), is divided by the isotropic dispersion to generate an isotropic dispersion difference value. The isotropic dispersion difference value is compared to an isotropic threshold, $\text{thresh}_{iso}$. If the isotropic dispersion difference value is greater than the isotropic threshold a defect is detected.

In connection with the directional defect detector equation, the value $SAD_{dir}$ is a directional dispersion that is the minimum of the dispersions calculated using the kernels shown in FIG. 4*b* as described above. In equation 2, the pixel error is divided by the directional dispersion to generate a directional dispersion difference value. The directional dispersion difference value is compared to a directional threshold, $\text{thresh}_{dir}$. If the directional dispersion difference value is greater than the directional threshold a defect is detected.

The two thresholds $\text{thresh}_{iso}$ and $\text{thresh}_{dir}$ are numerical values used to determine whether a defective pixel is detected. The setting of the two thresholds, $\text{thresh}_{iso}$ and $\text{thresh}_{dir}$, will be described in greater detail below. However, in general, it is desirable to trigger the isotropic defect detector equation in a case that a pixel under consideration is in an area of the image that is generally flat, and it is preferable to trigger the directional defect detector equation in a case that the pixel under consideration is in an area of the image that is on an edge. A technique for controlling the thresholds $\text{thresh}_{iso}$ and $\text{thresh}_{dir}$ to allow selective triggering of the two defect detector equations will now be described with reference to FIG. 5.

Figure 5:
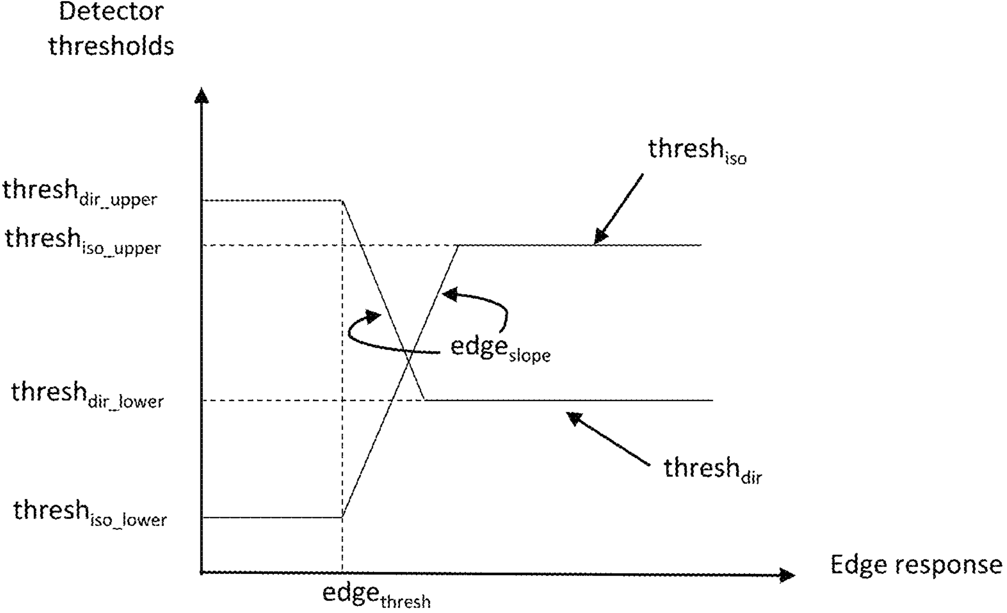
FIG. 5 is a chart showing how dynamic threshold values for performing defective pixel detection vary with edge response.

In a general case, the two thresholds $\text{thresh}_{iso}$ and $\text{thresh}_{dir}$, could be set to have constant values. However, FIG. 5 shows an example in which the thresholds are configured to be a function of the edge response. It is recalled from the description of FIGS. 3*a* and 3*b*, that the edge response is a maximum value of the accumulated gradients at a pixel location. Accordingly, a higher edge response represents a higher maximum directional gradient and a greater likelihood that the pixel is on an edge.

FIG. 5 shows the two thresholds $\text{thresh}_{iso}$ and $\text{thresh}_{dir}$ varying as a function of the edge response. Each of the thresholds is defined by a lower value, an upper value, an edge threshold, $\text{edge}_{thresh}$, at which the thresholds start to transition between the upper and lower (or lower and upper) values, and a parameter, $\text{edge}_{slope}$, that defines a steepness of the transition.

When the edge response is lower (i.e., the pixel under consideration is likely to be in a relatively flat region of the image), the isotropic threshold has a lower value ($\text{thresh}_{iso\_lower}$) than the directional threshold ($\text{thresh}_{dir\_upper}$). Accordingly, the isotropic detector above is more likely to be triggered by a pixel that deviates from the local dispersion in a case that the edge response is lower. In this region, the defective pixel detection is therefore more likely to be driven by the isotropic dispersion around the pixel under consideration.

In contrast, when the edge response is higher (i.e., the pixel under consideration is likely to be on or close to an edge), the isotropic threshold has a higher value ($thresh_{iso\_upper}$) than the directional threshold ($thresh_{dir\_lower}$). Accordingly, the directional detector above is more likely to be triggered by a pixel that deviates from the local dispersion when the edge response is higher. In this region, the defective pixel detection is therefore more likely to be driven by the directional dispersion.

The values $edge_{thresh}$ and $edge_{slope}$ provide a smooth transition between the regimes described above as shown in FIG. 5.

The difference between the pixel value and the median pixel value of its neighbours may not be high enough to pass the thresholds in equation 1 and equation 2. In such a case, the pixel is determined not to be a defective pixel. In this case, the pixel is within an expected range of pixel values.

If the difference between the pixel value and the median pixel value triggers the isotropic pixel defect detector equation, the pixel is determined to be an isotropic defect. If the difference between the pixel value and the median pixel value triggers the directional pixel defect detector equation, the pixel is determined to be a directional defect. In a case that the directional pixel defect detector equation is triggered, the direction that was determined to have the lowest gradient when calculating the directional gradients for that pixel of interest, as described with reference to FIG. 3*a*, may be recorded with the defective pixel detection. The recorded direction most likely indicates a direction along the edge. In some embodiments this recorded direction may be used for pixel defect correction.

If a pixel defect is high enough to meet both the pixel defect detector equations, the type of pixel defect may be determined based on the edge response value. If the edge response value is below the value $edge_{thresh}$, the pixel defect may be determined to be an isotropic defect. If the edge response value is above $edge_{thresh}$, the pixel defect may be determined to be a directional pixel defect.

A pixel defect detector of the type described above may have different applications. As noted in the introduction, in some implementations, pixel defects can be caused by transmission or storage errors. Accordingly, in some embodiments, in response to the determining that there is a pixel defect, the error may be corrected by requesting retransmission or comparing the pixel value to a value in a backup image.

Figure 6:
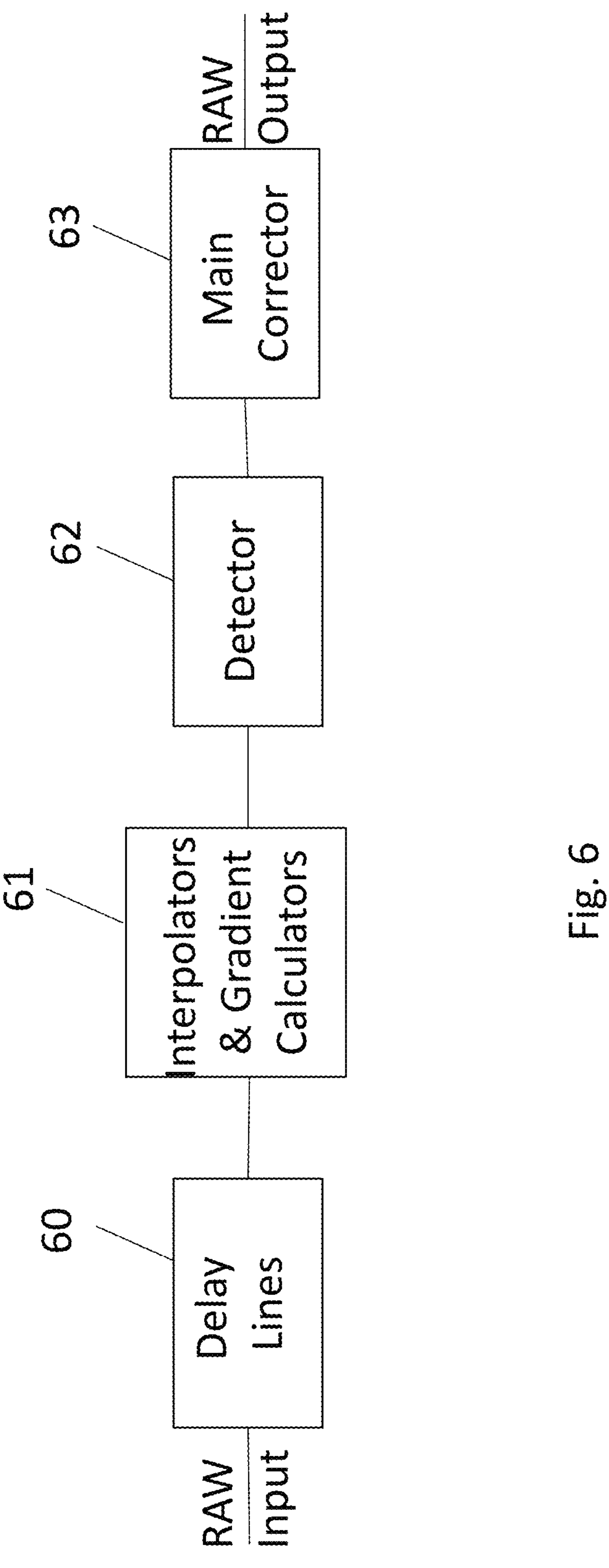
FIG. 6 illustrates a pipeline for detecting pixel defects and correcting detected pixel defects.

In some applications, the pixel defect may be caused by errors such as defects of a sensor or noise at an image sensor that captured the image. In such case, a reference image may be unavailable. FIG. 6 illustrates a pipeline for detecting and correcting defects in images for such an example.

As illustrated in FIG. 6, digital image data may be input into delay lines 60. For example, the digital image data may be streamed from a sensor in image capture device 10 during readout of the sensor into the delay lines 60.

A pixel of image data may be read from the delay lines 60 by the interpolators and gradient calculators component 61. Interpolators in the interpolators and gradient calculators component 61 may be configured to perform isotropic interpolation using values of surrounding image pixels in order to generate interpolated values for the pixel of image data as described above with reference to FIG. 3*a*. The interpolators may also be configured to perform directional interpolation to determine estimated values for a pixel in different directions by interpolating pixel values from surrounding pixels in different directions. Examples of kernels for performing the directional interpolation are shown in FIG. 7. As with the gradient kernels, the interpolation is performed on a channel-by-channel basis and in some directions different kernels may be provided for different colour channels. The 5×5 size of the kernels shown is illustrative and different size kernels may be used in other embodiments. Further, the particular values in the kernels are also illustrative and may be varied depending on the application.

The method described above in connection with FIGS. 2 to 5 is then performed by a detector 62. In particular, the defect detectors described in equations 1 and 2 are implemented. The detector 62 outputs a signal indicating whether or not a defect is detected. Further, if a defect is detected, the detector may output a signal indicating whether the detected defect is an isotropic defect that triggered the isotropic defect detector or a directional defect that triggered the directional defect detector. The defect detector 62 may further output a direction representing the minimum gradient in a case that a directional defect is detected.

The main corrector 63 shown in the pipeline in FIG. 6 is configured to correct any pixel defects that have been detected by the detector 62. If no defect has been detected, the main corrector 63 does not perform any processing. If an isotropic defect is detected, the pixel value is replaced by the isotropic pixel value that was generated by the interpolators and gradient calculators component 61. If a directional defect has been detected, the pixel value is replaced by the interpolated value that was generated by the interpolators and gradient calculators component 61 in the direction indicated by the detector 62 in association with the directional defect.

The levels of the two thresholds $thresh_{iso}$ and $thresh_{dir}$ may be varied depending upon the use of the defect detector, level of noise in an image to be subject of the defect detection, format of image data received from a sensor etc. In some implementations, the thresholds may depend upon the intensity levels within an image or gain (digital or analogue) applied during image generation. The use of analogue gain, such as use of high ISO on an image sensor during image capture, may impact noise levels. However, in some implementations the thresholds may be set manually as follows.

Initially the thresholds $thresh_{iso}$ and $thresh_{dir}$ are set to high values, both at high and low edge response, such that no or very few pixel defects are detected. The threshold, $thresh_{iso}$ lower, is then lowered to correct pixel defects in the flatter (lower edge response) portions of an image. This may be set by gradually lowering the threshold until all or most visible pixel defects are detected (and in some embodiments corrected) and before and excessive number of defects are detected that would result in smoothing or loss of detail if corrected in an image being processed.

As a next step, the directional threshold, $thresh_{dir\_lower}$, may be lowered to remove visible pixel defects on or near edges in a digital image. Again, this may be done by gradually lowering the threshold until all or most visible pixel defects are detected and before an excessive number of defective pixels are detected that would result in unnecessary smoothing of loss of detail if corrected in an image being processed.

Finally, the thresholds, $thresh_{dir\_upper}$, $thresh_{iso\_upper}$, $edge_{thresh}$ and $edge_{slope}$ may be adjusted. The thresholds $thresh_{dir\_upper}$ and $thresh_{iso\_upper}$ should be kept reasonably high because it is preferable that these thresholds do not trigger. However, adjusting these levels and the edge related parameters allows the transition between the defect detection in the smooth portions of an image and defect detection in edge portions of the image to be controlled.

The above embodiments are to be understood as illustrative examples of the invention. Further embodiments of the invention are envisaged. For example, the embodiments described above use data from a sensor with an RGB Bayer array. The upper part of FIG. 8 shows such an RGB Bayer colour filter array (CFA). Below, the RGB CFA is shown an RGB-Ir CFA that includes additional sensor sites that detect infra-red radiation. The gradient kernels shown in FIG. 3*a* make use of several different neighbouring pixel values to determine each gradient. Further, the red and blue channels, which have fewer pixel sites in an RGB Bayer array, are accumulated before the largest gradient is determined. The calculation of multiple gradients has an effect of somewhat reducing noise in the gradient detection and improving the reliability of the edge response value. In a further embodiment, the RGB-Ir CFA is used and an additional channel including the infrared image data is provided. The gradients and interpolation may additionally be performed over the infrared channel. In general, the techniques described above are applicable to any other colour filter array pattern.

In yet further embodiments, the above-described method may be performed using a monochromatic sensor. In such an embodiment, only a single colour channel is provided. In such embodiments, the accumulation step shown in FIG. 3*a* is omitted because there are not multiple channels to accumulate over.

In the embodiments described above, the isotropic pixel defect detector and the directional pixel defect detector are expressed as a ratio of the difference between the pixel value and the median pixel value and the dispersion. In further embodiments, each pixel defect detector may be expressed as a difference rather that a ratio. In other words, a comparison is made between the difference between the pixel value and the median pixel value and the dispersion. However, how that comparison is made is not material. Further, while a median pixel value has been used as a representative surrounding pixel value in embodiments above, other measures such as an average of the neighbouring pixel values or the value determined by the isotropic interpolation may be used. In further embodiments a combination of the average and median may be used or an edge aware technique for determining a representative value may be used where a sub-set of pixels on the same edge are used to determine a median value, an average value or a combination of a median value and the average value.

The methods described above have various applications. For example, the defect detection and correction method described in connection with FIG. 6 may serve as a user controlled de-noising algorithm. For example, a user may be allowed to adjust the parameters $thresh_{iso\_lower}$, $thresh_{iso\_upper}$, $thresh_{dir\_lower}$, $thresh_{dir\_upper}$, $edge_{thresh}$, and $edge_{slope}$ to control noise correction. In some examples, the denoising may be performed on a luminance channel of HSL image data. An interface provided for controlling the denoising process may include controls to maintain the relationship shown in FIG. 5 such that $thresh_{iso}$ lower is lower than $thresh_{dir\_upper}$ when the edge response is lower (i.e., below $edge_{thresh}$) and such that $thresh_{iso}$ upper is greater than $thresh_{dir\_lower}$ at higher edge response values.

The defect detection methods described above may also be used when performing demosaicing to convert from Bayer to RGB colour data. By detecting defective pixels on a pixel-by-pixel basis in each colour channel, variations within each colour channel are clipped in dependence upon local pixel value variance. This tends to reduce colour noise in demosaicing algorithms. The results may be further improved near edges because interpolated values are selected based on the detected gradient local to the pixel. As with the noise reduction described above, a user interface may be provided to allow a user to control the parameters used to perform the demosaicing algorithm. In this way, the user may adjust the parameters in accordance with their preferences.

It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

What is claimed is:

1. A method comprising:

receiving digital image data;

for each pixel of the digital image data:

determining an isotropic dispersion difference value by determining a ratio or difference between a pixel error and an isotropic dispersion, wherein the pixel error is a difference between a pixel value under consideration and an estimated pixel value, the estimated pixel value is determined based on neighboring pixel values, and the isotropic dispersion is a measure of how much pixel values in a set of neighboring pixel values uniformly distributed around the pixel under consideration vary;

comparing the isotropic dispersion difference value to an isotropic threshold;

determining a directional dispersion difference value by determining a ratio or difference between the pixel error and a directional dispersion, wherein the directional dispersion is a weighted measure of how much pixel values in a set of neighboring pixel values around the pixel under consideration in a given direction vary;

comparing the directional dispersion difference value to a directional threshold; and determining that the pixel under consideration is defective based on at least one of the comparison results.

2. A method according to claim 1, wherein the pixel under consideration is determined to be defective if at least one of: the isotropic dispersion difference value is greater than the isotropic threshold and the directional dispersion difference value is greater than the directional threshold.

3. A method according to claim 1, further comprising determining an edge response value based on one or more gradients between neighboring pixel values of the pixel under consideration, wherein the isotropic threshold and the directional threshold vary as a function of the edge response.

4. A method according to claim 3, wherein:

lower values of the edge response correspond to flatter regions of the digital image data and higher values of the edge response correspond to edge regions of the digital image data, and the isotropic threshold is lower than the directional threshold at lower values of the edge response and the directional threshold is lower than the isotropic threshold at higher values of the edge response.

5. A method according to claim 4, wherein:

the isotropic threshold varies with edge response such that it has an isotropic lower value and an isotropic upper value and transitions between the isotropic lower value and the isotropic upper value, the directional threshold varies with edge response such that it has a directional lower value and a directional upper value and transitions between the directional lower value and the directional upper value, wherein the isotropic lower value is lower than the directional upper value at lower values of the edge response and the directional lower value is lower than the isotropic upper value at higher values of the edge response.

6. A method according to claim 3, wherein the edge response is determined based on a largest of a plurality of gradients in different directions determined for the pixel under consideration.

7. A method according to claim 6, wherein one or more of the gradients is determined based on gradients in the same direction across a plurality of colour channels.

8. A method according to claim 1, wherein:

a plurality of local directional dispersions is determined by performing weighted sums of absolute differences compared to a reference pixel value on a set of pixels surrounding the pixel under consideration, the weights for each of the local directional dispersions more heavily weights dispersions associated with pixels in different directions from the pixel under consideration, and the directional dispersion is selected to be the smallest local directional dispersion.

9. A method according to claim 8, wherein the method further comprises determining a corrected value for a pixel that is determined to be defective.

10. A method according to claim 9, wherein in a case that a pixel under consideration is determined to be defective based on comparison of the directional dispersion difference value to the directional threshold, the defective pixel is corrected with an interpolated value determined using neighboring pixel values excluding the defective pixel location in a direction corresponding to the smallest local directional dispersion that forms the directional dispersion.

11. A method according to claim 9, wherein in a case that a pixel under consideration is determined to be defective based on comparison of the directional dispersion difference value to the directional threshold, the defective pixel is corrected with an interpolated value determined using neighboring pixel values excluding the defective pixel location in a direction determined based on one or more gradients determined using neighboring pixels and excluding the pixel under consideration.

12. A method according to claim 1, wherein the digital image data is one of data from an RGB Bayer sensor array, data from an RGB-IR sensor array, data from a monochromatic sensor array, and data from any other colour filter pattern sensor array.

13. A method according to claim 1 wherein the estimated pixel value is a median value of a set of surrounding pixels, or an average value of the set of surrounding pixels, or a combination of the median value and average value, or an edge-aware pixel estimate where a sub-set of pixels on the same edge are used to determine a median value, an average value or a combination of the median value and the average value.

14. A digital image data processing device comprising:

one or more hardware units configured to:

receive digital image data;

for each pixel of the digital image data:

determine an isotropic dispersion difference value by determining a ratio or difference between a pixel error and an isotropic dispersion, wherein the pixel error is a difference between a pixel value under consideration and an estimated pixel value, the estimated pixel value is determined based on neighboring pixel values, and the isotropic dispersion is a measure of how much pixel values in a set of neighboring pixel values uniformly distributed around the pixel under consideration vary;

compare the isotropic dispersion difference value to an isotropic threshold;

determine a directional dispersion difference value by determining a ratio or difference between the pixel error and a directional dispersion, wherein the directional dispersion is a weighted measure of how much pixel values in a set of neighboring pixel values around the pixel under consideration in a given direction vary;

compare the directional dispersion difference value to a directional threshold; and determine that the pixel under consideration is defective based on at least one of the comparison results.

15. A non-transitory computer readable storage medium storing a program that, when executed by a digital image processing device, causes the digital image processing device to perform a method comprising:

receiving digital image data;

for each pixel of the digital image data:

determining an isotropic dispersion difference value by determining a ratio or difference between a pixel error and an isotropic dispersion, wherein the pixel error is a difference between a pixel value under consideration and an estimated pixel value, the estimated pixel value is determined based on neighboring pixel values, and the isotropic dispersion is a measure of how much pixel values in a set of neighboring pixel values uniformly distributed around the pixel under consideration vary;

comparing the isotropic dispersion difference value to an isotropic threshold;

determining a directional dispersion difference value by determining a ratio or difference between the pixel error and a directional dispersion, wherein the directional dispersion is a weighted measure of how much pixel values in a set of neighboring pixel values around the pixel under consideration in a given direction vary;

comparing the directional dispersion difference value to a directional threshold; and determining that the pixel under consideration is defective based on at least one of the comparison results.

* * * * *